(12) United States Patent
Sheem et al.

(10) Patent No.: US 6,440,610 B1
(45) Date of Patent: Aug. 27, 2002

(54) NEGATIVE ACTIVE MATERIAL FOR LITHIUM SECONDARY BATTERY AND MANUFACTURING METHOD OF SAME

(75) Inventors: Kyou-Yoon Sheem; Sang-Young Yoon, both of Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 28 days.

(21) Appl. No.: 09/710,689

(22) Filed: Nov. 10, 2000

(30) Foreign Application Priority Data

Dec. 10, 1999 (KR) ............................................ 99-56718

(51) Int. Cl.[7] ................................................ H01M 4/58
(52) U.S. Cl. ................................ 429/231.8; 429/231.4; 429/232; 429/40; 423/414; 423/448; 423/447.3; 423/445 R; 423/447.1
(58) Field of Search ........................... 429/231.8, 231.4, 429/232, 40; 423/414, 448, 447.3, 445 R, 447.1

(56) References Cited

U.S. PATENT DOCUMENTS 6,280,697 B1 * 8/2001 Zhou et al. .................. 423/414
6,333,016 B1 * 12/2001 Resasco et al. .......... 423/445 B

FOREIGN PATENT DOCUMENTS

| JP | 8-7895 | 1/1996 |
| JP | 8-69797 | 3/1996 |
| JP | 9-161776 | 6/1997 |

* cited by examiner

*Primary Examiner*—Laura Weiner
(74) *Attorney, Agent, or Firm*—Christie, Parker & Hale, LLP

(57) ABSTRACT

The present invention relates to a negative active material for a lithium secondary battery and a manufacturing method thereof, wherein the negative active material comprises a crystalline or amorphous carbon core, a catalyst layer formed on the core, and carbon vapor growing fiber or carbon nanotubes.

The negative active material not only forms a fine path between active materials but also improves conductivity between neighboring active materials so that a battery having improved high rate and cycle life characteristics can be provided, since carbon vapor growing fiber or carbon nanotubes are formed on a surface layer of the negative active material.

14 Claims, 1 Drawing Sheet

NEGATIVE ACTIVE MATERIAL FOR LITHIUM SECONDARY BATTERY AND MANUFACTURING METHOD OF SAME

CROSS REFERENCE TO RELATED APPLICATION

This application is based on application No. 10-1999-56718 filed in the Korean Industrial Property Office on Dec. 10, 1999, the content of which is incorporated hereinto by reference.

BACKGROUND OF THE INVENTION (a) Field of the Invention

The present invention relates to a negative active material for a lithium secondary battery and a manufacturing method of the same, more particularly to a negative active material for a lithium secondary battery having superior high rate cycle life characteristics and a manufacturing method of the same.

(b) Description of the Related Art

Carbonaceous materials which are used as a negative material of a lithium secondary battery can mainly be classified into amorphous carbon and crystalline graphite, depending on the crystallinity of the substance. Crystalline graphite, which is more generally used out of the two materials, can again be classified into artificial graphite and natural graphite. Typical examples of artificial graphite include mesocarbon microbeads (MCMB) and mesocarbon fiber (MCF), and these are typically used in lithium secondary batteries.

Although natural graphite has a quite high crystallinity thus having a very high initial discharge capacity, it produces a flake shaped material during the crushing process because of its high crystallinity, and this causes an irreversible capacity increase at the edge of the natural graphite. In addition, natural graphite is severely compressed during electrode preparation, making it very difficult to secure an electrolyte penetration path between particles of active material, and a lithium ion transfer pathway is elongated compared with artificial graphite based active materials. Therefore, cycle life characteristics of natural graphite, particularly high rate cycle life characteristics, are inferior to artificial graphite of a spherical, fibrous, or amorphous form.

A method for improving cycle life of a battery by increasing conductivity between active materials is disclosed in Japanese Patent Laid-open Publication Nos. Hei 9-161776, Hei 8-7895, and Hei 8-69797. This is a method in which metallic particles such as Cu etc. are non-electrolytically plated on a graphite surface layer, or particulates such as Ni, Fe, etc. are mixed with an active material to be used as a negative pole plate. However, the method for plating metallic particulates on a graphite surface has little effect upon the form of the active material, thus it is limited in improving conductivity on a pole plate having high density for providing high capacity, and uniform mixing is practically impossible due to density differences among each material during the preparation of a large amount of slurry in the method for mixing graphite, carbon powder, and metallic particulates.

SUMMARY OF THE INVENTION

It is an object of the present invention to provide a negative active material for a lithium secondary battery which has superior high rate cycle life characteristics even with a high pole plate density by improving conductivity between active materials.

It is other object of the present invention to provide a method for manufacturing the negative active material for a lithium secondary battery.

In order to accomplish the above described objects, the present invention provides a negative active material for a lithium secondary battery including crystalline or amorphous carbon on which surface catalysts are doped or dispersed, and carbon vapor growing fiber or carbon nanotubes are grown.

Furthermore, the present invention provides a method for manufacturing a negative active material for a lithium secondary battery. In this method, crystalline or amorphous carbon is mixed with a catalyst element or compound thereof to produce a crystalline or amorphous carbon on which a surface catalyst element or compound thereof is doped or dispersed. The crystalline or amorphous carbon on which the catalyst element or compound thereof is doped or dispersed; are then carbonized. Thereafter, the carbonized crystalline or amorphous carbon is vapor deposited at a temperature of 300 to 1500° C. under the existence of carbon-containing gas to form carbon vapor growing fiber or carbon nanotubes on a surface of the crystalline or amorphous carbon.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

The present invention provides a negative active material for a lithium secondary battery. The negative active material includes crystalline or amorphous carbon on which surface catalysts are doped or dispersed, and carbon vapor growing fiber or carbon nanotubes are grown.

Carbon vapor growing fiber or nanotubes are formed on the surface of a negative active material for a lithium secondary battery of the present invention. Conductivities among neighboring active materials are improved since carbon vapor growing fiber or nanotubes form fine paths between active materials thereby improving conductivities among neighboring active materials. Therefore, a negative active material of the present invention can improve high rate cycle life characteristics of a lithium secondary battery.

Structure of a negative active material of the present invention is explained further in detail as follows with reference to the attached drawings.

Figure 1:
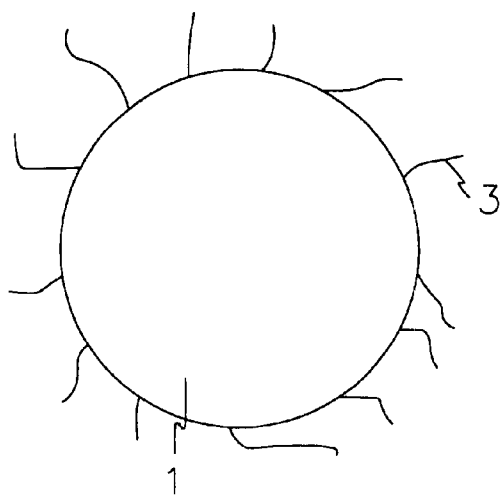
FIG. 1 is a cross sectional view schematically illustrating a structure of a negative active material according to one example of the present invention.

As illustrated in FIG. 1, a negative active material of the present invention includes crystalline or amorphous carbon 1, and carbon vapor growing fiber or carbon nanotubes 3 which are formed on a surface of the carbon. Catalysts are also doped or dispersed on the surface of the carbon. A length of the carbon vapor growing fiber or nanotube is preferably from 0.1 to 1000 nm. Effects derived from the formation of carbon vapor growing fiber or nanotubes are tenuous when a length of carbon vapor growing fiber or nanotube is less than 0.1 nm, and density is lowered so much that it is not easy to manufacture a pole plate using the final active material when a length of carbon vapor growing fiber or nanotubes exceeds 1000 nm. The carbon vapor growing fiber can further comprise the catalysts from the growing procedure of carbon fiber. The nanotubes can be in a single-wall, multi-wall or coil form.

Figure 2:
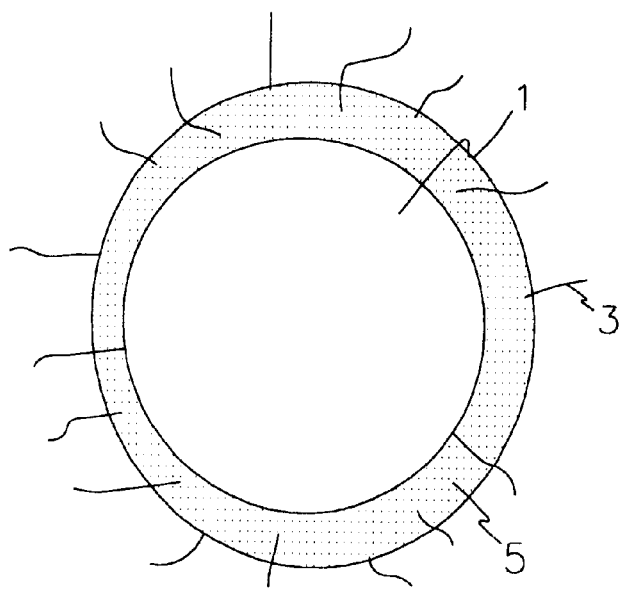
FIG. 2 is a cross sectional view schematically illustrating a structure of a negative active material according to another example of the present invention.

An amorphous carbon layer formed from an amorphous carbon precursor can be further included on the surface of the crystalline or amorphous carbon. In the case of further including an amorphous carbon layer, a crystalline or amorphous carbon core 1, and a layer 5 which is formed on the core and comprises amorphous carbon and catalysts are formed as illustrated in FIG. 2. In this structure, carbon vapor growing fiber or carbon nanotubes are grown in the layer 5.

Furthermore, the present invention provides a method for manufacturing a negative active material for a lithium secondary battery. In this method, crystalline or amorphous carbon is mixed with a catalyst element or compound thereof to produce a crystalline or amorphous carbon on which a surface catalyst element or compound thereof is doped or dispersed. The crystalline or amorphous carbon on which the catalyst element or compound thereof is doped or dispersed; are then carbonized. Thereafter, the carbonized crystalline or amorphous carbon is vapor deposited at a temperature of 300 to 1500° C. under the existence of carbon-containing gas to form carbon vapor growing fiber or carbon nanotubes on a surface of the crystalline or amorphous carbon.

A method for manufacturing this structured negative active material of the present invention is described in detail as follows according to whether or not an amorphous carbon precursor is used.

1) In Case of Not Using An Amorphous Carbon Precursor

Crystalline or amorphous carbon is mixed with a catalyst element or its compound. The catalyst element or its compound can be used either in a liquid phase or a solid phase. Water, organic solvent, or a mixture thereof can be used as a solvent in case of being used in a liquid phase. Ethanol, isopropyl alcohol, toluene, benzene, hexane, tetrahydrofuran, etc. can be used as an organic solvent. A mixing ratio of crystalline or amorphous carbon to the catalyst element is 99 to 90:1 to 10 weight %. The weight of the catalyst element which exists in the compound is used in the above range even in the case of using a compound of the catalyst element. Addition effects of the catalyst element are tenuous when an amount of the catalyst element is less than 1 weight %, and heterocompounds of the catalyst element are formed such that lithium ions can undesirably be hindered when an amount of the catalyst element exceeds 10 weight %.

A transition metal, semimetal, nonmetal, alkali metal, or alkaline-earth metal can be used as the catalyst element. Preferably, a transition metal such as Ni, Co, Fe, Mo, or Cr, a semimetal such as B, Al, Ga, Si, Sn, Bi, or P, a nonmetal such as F, P, S, Se, Br, Kr, I, or Xe, an alkali metal such as Na or K, or an alkaline-earth metal such as Mg or Ca can be used. Any compound can be used as a compound of the catalyst element if it includes the described catalyst elements, e.g., oxides, carbides, nitrides, etc. A concrete example of a catalyst element compound is nickel nitride.

Natural graphite, artificial graphite, coke, soft carbon, or hard carbon can be used as the crystalline or amorphous carbon. Voltage flatness is superior when crystalline carbon among them is used, and initial discharge capacity is particularly quite superior when natural graphite is used. Therefore, it is more preferable to use natural graphite. The natural graphite or artificial graphite can be in a flake, amorphous, plate, spherical, or fibrous form.

A spray method, fluidized bed mixing method, or mechanical mixing method can be used as the mixing method. It is not necessary to conduct a separate drying process since drying is done while mixing in the case of using a spray method or fluidized bed mixing method. On the other hand, a mixture drying process is further carried out in the case of using a mechanical mixing method, particularly a wet mechanical mixing method.

When these mixing and drying processes are completed, crystalline or amorphous carbon deposition on the surface layer of which the catalyst element or compound thereof is doped or dispersed is completed.

Crystalline particles or amorphous carbon particles on the surface layer of which the catalyst element or compound thereof is doped or dispersed are carbonized. The carbonization process is carried out at a temperature of 800 to 1200° C. for 2 to 24 hours.

An oxidation process is further carried out after the carbonization process in the case of using nitrides or carbides as catalyst element compounds. It is not necessary to carry out the oxidation process in the case of using oxides since that process involves setting conditions in which the catalyst element compounds can be deoxidized in order to carry out a subsequent process of reduction. The oxidation process is carried out in air, at a temperature at which nitrides or carbides of catalyst elements used in the present invention can be oxidized, for example at a temperature of about 400° C. in the case of using nickel nitrate as a catalyst element compound. Catalyst element compounds, i.e., nitrides and carbides are converted into oxides in the oxidation process.

Subsequently, the obtained crystalline or amorphous carbon is heat treated under the reduction environment. Heat treatment can be conducted at a temperature of 300° C. or more under the reduction environment of hydrogen. Oxidized catalyst element compounds are reduced according to the heat treatment process so that only catalyst elements are consequently left on the surface of the crystalline or amorphous carbon.

Subsequently, crystalline or amorphous carbon on the surface of which a catalyst element layer is formed is vapor deposited under an environment of carbon-containing gas. A gas which is derived from a carbon source, i.e., an aliphatic or aromatic compound can be used as the carbon-containing gas. For example, a gas which is derived from methane, ethane, propane, benzene, toluene, polyvinyl alcohol, and acetylene can be used as a carbon source. The deposition process can be conducted at a temperature of 300 to 1500° C. The deposition is conducted for a sufficient time until carbon vapor growing fiber or nanotubes are formed. If the fiber or nanotubes are excessively elongated when the deposition is conducted for a very long time, density of the final active material is lowered so that it can be difficult to manufacture a pole plate using the material.

Thermal chemical vapor deposition or plasma chemical vapor deposition can be used in the vapor or ion deposition process.

Carbon vapor growing fiber or nanotubes are grown on a catalyst which is doped or dispersed on the surface of the crystalline or amorphous carbon, if the deposition is carried out under conditions of the above described gas environment, temperature, and time. When carbon vapor growing fiber or nanotubes are formed on the surface of the crystalline or amorphous carbon, fine paths can be formed among active materials by interconnection and twisting of carbon vapor growing fiber or nanotubes so that lithium ions are easily transferred, and conductivity of carbon vapor growing fiber or nanotubes is superior so that conductivities between neighboring active materials can be improved.

Carbon vapor growing fiber is that fibrous carbon source which is made through a pyrolysis process on catalysts by a chemical potential difference between the catalyst and carbon. A nanotube is a carbon form which is formed by controlling catalysts and conditions thereof in the same method as in the vapor growing fiber formation, it has a shape such as a tube or a cylinder, and it is called a nanotube since the tube diameter is usually about 1 nm. Nanotubes are classified into single-wall nanotubes, multi-wall nanotubes, or coil nanotubes, depending on the rolled forms.

As described more in detail, the thermal chemical vapor deposition method can be performed by charging crystalline or amorphous carbon into a reaction container such as a ceramic boat, and then infusing carbon-containing gas into the reactor at a temperature of 300 to 1500° C.

When the vapor growing fiber or nanotube growth deposition process is completed, the gas environment is substituted from carbon-containing gas to inert gas, and cooled.

2) In the Case of Using An Amorphous Carbon Precursor

Crystalline carbon and a catalyst element or compound thereof are mixed with an amorphous carbon precursor. The amorphous carbon precursor can be used either in a liquid phase or in a solid phase. The solution is mixed with crystalline or amorphous carbon after dissolving the amorphous carbon precursor and the catalyst element or compound thereof in a solvent in the case of using an amorphous carbon precursor in a liquid phase. Water or organic solvent can be used as the solvent, and ethanol, isopropyl alcohol, toluene, benzene, hexane, tetrahydrofuran, etc. can be used as the organic solvent. A ratio of a mixed weight of amorphous or crystalline carbon and amorphous carbon precursor to a weight of catalyst element or compound thereof is 99 to 80:1 to 20. The mixing ratio of the amorphous or crystalline carbon and amorphous carbon precursor can be adequately controlled depending on desired physical properties of the final products.

A spray method, fluidized bed mixing method, or mechanical mixing method can be used as the mixing method. It is not necessary to carry out a separate drying process since drying is done while mixing in the case of using a spray method or fluidized bed mixing method. Contrary to this, a mixture drying process is further carried out in the case of using a mechanical mixing method, particularly a wet mechanical mixing method.

Crystalline or amorphous carbon is formed on a surface layer of which the coating layer of mixed amorphous carbon precursor and the catalyst element or compound thereof are deposited when the mixing and drying processes are carried out as described in the above. Crystalline or amorphous carbon is formed on the surface that is coated with amorphous carbon by heat treating crystalline or amorphous carbon at a temperature of 500 to 1500° C., and it is doped or dispersed with a catalyst element or compound thereof. Crystalline or amorphous carbon on which amorphous carbon is coated, and the catalyst element that is doped or dispersed, is manufactured by conducting the carbonization, oxidation, reduction, and deposition processes using the obtained crystalline or amorphous carbon in the same method as in the method in which the above described amorphous carbon precursor is not used.

Not only is the carbon vapor growing fiber or nanotube forming catalyst element doped or dispersed, but also carbon vapor growing fiber or nanotubes are formed on the surface of a negative active material manufactured by the above described processes. Furthermore, an amorphous carbon membrane can further be formed on the surface of the negative active material, and an irreversible reaction with graphite and electrolyte can be inhibited since the crystalline carbon core, i.e., the edge surface of the graphite can be protected due to the amorphous carbon membrane.

Generally, a negative pole should be manufactured so that a density of a pole plate can be 1.4 g/cc or more in order to exert a high capacity. However, there are problems in that electrolyte penetration is difficult, and the transfer pathway of lithium ions is elongated when a negative pole is manufactured using natural graphite so that such a high pole plate density can be secured. That is, there have been problems in that cycle life characteristics, particularly cycle life characteristics at a high rate are lowered due to a decrease of conductivity between particles of an active material. Therefore, artificial graphite having superior cycle life characteristics has been more favored as a negative active material than natural graphite having much superior initial discharge capacity. Contrary to this, a negative active material has much higher conductivity as nanotubes and carbon vapor growing fiber having superior conductivities are formed on the surface of the negative active material, and fine paths between active materials can be formed by interconnection and twisting of nanotubes and carbon vapor growing fiber such that high rate cycle life characteristics of a plate graphite based active material can be improved although an active material density on a pole plate is high.

Preferable EXAMPLES and COMPARATIVE EXAMPLES of the present invention are written as follows. However, the following EXAMPLES are only exemplifying the present invention, and the present invention is not limited to the following EXAMPLES.

EXAMPLE 1

After dissolving 20 g of nickel nitrate into water, the solution was mixed with 200 g of natural graphite. A graphite material on a surface layer of which particles of nickel nitrate were formed was obtained by spray drying the mixture. A resulting graphite material on which nickel oxides were formed was obtained Iby carbonizing the obtained graphite material at a temperature of 800° C., and oxidizing the carbide in air at a temperature of 400° C. for about 4 hours. The obtained resulting graphite material was passed through a reduction process in which hydrogen was used for about 20 hours at a temperature of 500° C., obtaining natural graphite powder on a surface layer of which Ni particles were formed. A vapor growing fiber was grown on Ni catalysts in a vapor deposition method by putting the obtained powder into a ceramic boat and injecting acetylene gas into the boat at a temperature of about 600° C. After reacting the reactant for about 30 minutes, acetylene gas was substituted with argon, and vapor growing fiber formed powder was slowly cooled to the ordinary temperature.

EXAMPLE 2

A negative active material was manufactured in the same method as in the EXAMPLE 1 except that a deposition temperature was changed from 600° C. to 900° C.

EXAMPLE 3

After mixing water in which 20 g of polyvinyl alcohol and 20 g of nickel nitrate were dissolved with 200 g of natural graphite, the mixture was spray coated so that a coated membrane in which polyvinyl alcohol was mixed with nickel nitrate particles was formed on a graphite surface layer. An amorphous coat was formed by heat treating the obtained graphite at a temperature of 900° C. The carbonization, oxidation, reduction, and deposition processes were carried out using the amorphous coat formed graphite in the same method as in the EXAMPLE 1.

EXAMPLE 4

A negative active material was manufactured in the same method as in the EXAMPLE 1 except that cobalt nitrate was used as the catalyst.

COMPARATIVE EXAMPLE 1

Only natural graphite was used as a negative active material.

COMPARATIVE EXAMPLE 2

A negative active material was manufactured in the same method as in the EXAMPLE 1 except that vapor deposition was conducted on the surface of a graphite active material at a temperature of 900° C., not using metallic catalysts but using only carbon-containing gas.

Conductivities of active materials manufactured in the methods of EXAMPLES 1, 4, and COMPARATIVE EXAMPLE 1, and the results of measurement are represented in the following Table 1.

TABLE 1

| Classification | Conductivities (S/cm) |
|---|---|
| EXAMPLE 1 | 59.3 |
| EXAMPLE 4 | 62.1 |
| COMPARATIVE EXAMPLE 1 | 23.5 |

As represented in Table 1, conductivities of negative active materials of EXAMPLES 1 and 4 are 2 to 3 times higher than conductivity of natural graphite of COMPARATIVE EXAMPLE 1. So, the more superior conductivity brings about improvements in the high rate cycle life characteristics. This can be seen in the following cell characteristics test more explicitly.

After preparing a slurry by mixing the active material powder manufactured in methods of the EXAMPLES 1 to 4, and COMPARATIVE EXAMPLES 1 to 2 with polyvinylidene fluoride binder, the slurry was casted into a copper (Cu) foil collector, manufacturing a negative pole plate. Density of the slurry comprising binder was 1.65 cm/g or more in the manufactured negative pole plate. The negative pole plate was dried in an oven of 120° C. A coin type lithium ion secondary half-cell was manufactured using lithium metal foil as a reference electrode and 1 M of $LiPF_6$/ethylene carbonate/dimethyl carbonate as an electrolyte in the manufactured negative active material pole plate.

Discharge capacity, charge capacity, and cell efficiencies of the first cycle were measured when the manufactured lithium secondary half-cell was charged and discharged at a rate of 0.2 C. Furthermore, a ratio of discharge capacity during the $100^{th}$ cycle to the discharge capacity and initial capacity during the first cycle was measured when the manufactured lithium secondary half-cell was charged and discharged at a rate of 1 C, and the results of measurement are represented in the following Table 2.

TABLE 2

| Classification | EXAMPLE 1 | EXAMPLE 2 | EXAMPLE 3 | EXAMPLE 4 | COMPARATIVE EXAMPLE 1 | COMPARATIVE EXAMPLE 2 |
|---|---|---|---|---|---|---|
| First cycle discharge capacity (0.2 C) [mAh/g] | 345 | 348 | 361 | 352 | 322 | 330 |
| First cycle charge capacity (0.2 C) [mAh/g] | 383 | 382 | 384 | 383 | 398 | 440 |
| First cycle cell efficiency (0.2 C) [%] | 90 | 91 | 94 | 92 | 81 | 75 |
| First cycle discharge capacity (1.0 C) [%] | 340 | 342 | 358 | 345 | 268 | 308 |
| Efficiency of 100 cycle 1.0 C initial capacity to discharge capacity [%] | 83 | 85 | 82 | 83 | 51 | 59 |

As represented in the Table 2, cells using negative active materials manufactured in methods of EXAMPLES 1 to 4 have more superior first cycle discharge capacity, charge capacity, and cell efficiencies than a cell manufactured in the method of COMPARATIVE EXAMPLE 1 using natural graphite having superior initial capacity, when the cells were charged and discharged in a rate of 0.2 C. Particularly during the high rate charging and discharging (1.0 C), discharge capacity rapidly decreased in a cell using a negative active material of COMPARATIVE EXAMPLE 1, while discharge capacities are much less decreased in cells using negative active materials of EXAMPLES 1 to 4. This seems to be because natural graphite of COMPARATIVE EXAMPLE 1 has a high pole plate density by the rolling process due to its flake shape making electrolyte penetration slow, thereby dropping the ion transfer rate and conductivity so that high rate cycle life characteristics are decreased. Contrary to this, it seems that carbon vapor growing fiber or carbon nanotubes are formed on the surface of negative active materials of EXAMPLES 1 to 4, thereby not only forming fine pathways between the active materials but also improving conductivities among neighboring active materials so that high rate cycle life characteristics are improved.

Furthermore, it can be found that the first charge capacity (during 0.2 C charging and discharging) of COMPARATIVE EXAMPLE 2 in which only the vapor deposition process is conducted without using catalysts is more superior than first charge capacities of EXAMPLES 1 to 4, while discharge capacity and cell efficiencies of COMPARATIVE EXAMPLE 2 are more remarkably dropped than those of EXAMPLES 1 to 4. Furthermore, cells using negative active materials of EXAMPLES 1 to 4 also have a more superior discharge capacity during high rate charging and discharging (1.0 C) than a cell using a negative active material of COMPARATIVE EXAMPLE 2.

Additionally, cells using active materials of EXAMPLES 1 to 4 represented much more superior efficiencies of $100^{th}$ cycle discharge capacities to initial capacities during the high rate charging and discharging (1.0 C) compared with cells using active materials of COMPARATIVE EXAMPLES 1 to 2. Therefore, it can be seen that high rate cycle life characteristics of active materials of EXAMPLES 1 to 4 are more superior than those of COMPARATIVE EXAMPLES 1 and 2.

As described in the above, since carbon vapor growing fiber or carbon nanotubes are formed on the surface of a negative active material of the present invention, not only are fine pathways formed between active materials but also conductivities between neighboring active materials are improved such that a battery having improved high rate cycle life characteristics can be provided.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative active material for a lithium secondary battery comprising crystalline or amorphous carbon comprising on a surface thereof one or more surface catalysts and at least one of carbon vapor growing fibers and carbon nanotubes.

2. The negative active material for a lithium secondary battery according to claim 1, wherein the carbon vapor growing fiber further comprises catalysts.

3. The negative active material for a lithium secondary battery according to claim 2, wherein the one or more surface catalysts are selected from the group consisting of transition metals, semimetals, nonmetals, alkali metals, and alkaline-earth metals.

4. The negative active material for a lithium secondary battery according to claim 3, wherein the transition metal is selected from the group consisting of Ni, Co, Fe, Mo, and Cr, the semimetal is selected from the group consisting of B, Al, Ga, Si, Sn, Bi, and P, the nonmetal is selected from the group consisting of F, P, S, Se, Br, Kr, I, and Xe, the alkali metal is Na or K, and the alkaline-earth metal is Mg or Ca.

5. The negative active material for a lithium secondary battery according to claim 1, wherein the one or more surface catalysts are selected from the group consisting of transition metals, semimetals, nonmetals, alkali metals, and alkaline-earth metals.

6. The negative active material for a lithium secondary battery according to claim 5, wherein the transition metal is selected from the group consisting of Ni, Co, Fe, Mo, and Cr, the semimetal is selected from the group consisting of B, Al, Ga, Si, Sn, Bi, and P, the nonmetal is selected from the group consisting of F, P, S, Se, Br, Kr, I, and Xe, the alkali metal is Na or K, and the alkaline-earth metal is Mg or Ca.

7. The negative active material for a lithium secondary battery according to claim 1, further comprising amorphous carbon shell on a surface thereof.

8. The negative active material for a lithium secondary battery according to claim 1, wherein the carbon vapor growing fiber or nanotubes have a length of 0.1 to 1000 nm.

9. The negative active material for a lithium secondary battery according to claim 1, wherein the nanotube is in a single-wall, multi-wall, or coil form.

10. A method for manufacturing a negative active material for a lithium secondary battery comprising the steps of:

forming crystalline or amorphous carbon on which a surface catalyst element or compound thereof is doped or dispersed by mixing crystalline or amorphous carbon and the catalyst element or compound thereof;

carbonizing crystalline or amorphous carbon on which the catalyst element or compound thereof is doped or dispersed; and forming carbon vapor growing fiber or carbon nanotubes on a surface of the crystalline or amorphous carbon which is carbonized by vapor depositing the carbonized crystalline or amorphous carbon at a temperature of 300 to 1500° C. under the existence of carbon-containing gas.

11. The method for manufacturing a negative active material for a lithium secondary battery according to claim 10 further comprising a step of reducing the carbonized crystalline or amorphous carbon after the carbonizing step and before the depositing step.

12. The method for manufacturing a negative active material for a lithium secondary battery according to claim 11, wherein the mixture of the crystalline or amorphous carbon and catalyst element or compound thereof is further mixed with an amorphous carbon precursor.

13. The method for manufacturing a negative active material for a lithium secondary battery according to claim 10, wherein the crystalline based or amorphous based carbon is selected from the group consisting of natural graphite, artificial graphite, coke, soft carbon, and hard carbon.

14. The method for manufacturing a negative active material for a lithium secondary according to claim 10, wherein the deposition method is selected from the group consisting of chemical vapor deposition and plasma vapor deposition.

* * * * *

UNITED STATES PATENT AND TRADEMARK OFFICE
CERTIFICATE OF CORRECTION

PATENT NO.    : 6,440,610 B1
DATED         : August 27, 2002
INVENTOR(S)   : Kyou-Yoon Sheem and Sang-Young Yoon It is certified that error appears in the above-identified patent and that said Letters Patent is hereby corrected as shown below:

Column 10,
Line 7, replace "claim 5" with -- claim 3 --.

Signed and Sealed this

First Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,440,610 B1
DATED : August 27, 2002
INVENTOR(S) : Kyou-Yoon Sheem and Sang-Young Yoon It is certified that error appears in the above-identified patent and that said Letters Patent is hereby corrected as shown below:

Column 10,
Line 56, before "according" insert -- battery --.

Signed and Sealed this

Seventh Day of September, 2004

JON W. DUDAS
*Director of the United States Patent and Trademark Office*